(No Model.)
J. P. KENNEDY.
MACHINE FOR SWAGING THE ENDS OF TUBES.
No. 457,954. Patented Aug. 18, 1891.
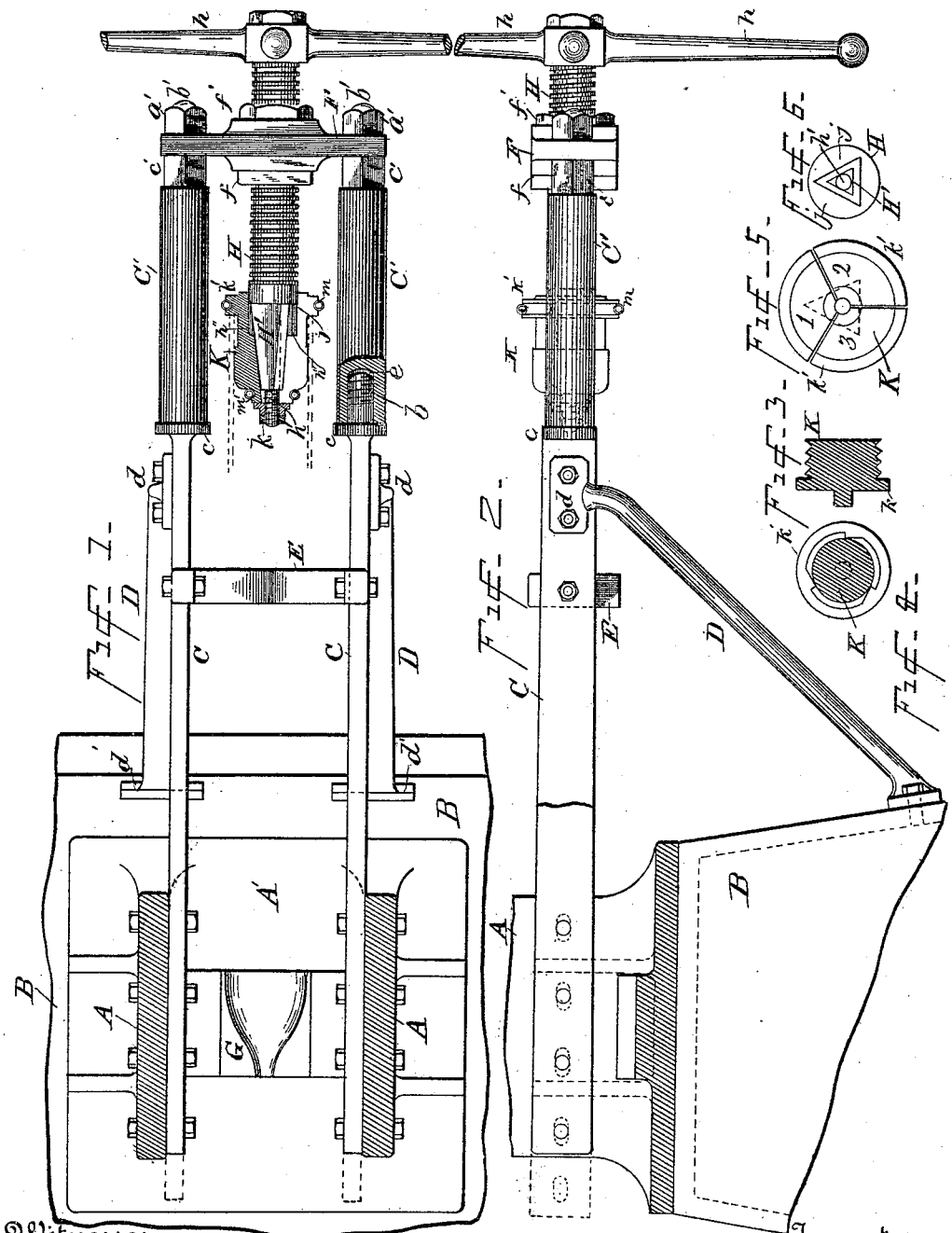
Witnesses
Arthur A. Orb.
M. Georgii
Inventor
John P. Kennedy
By his Attorney
E. B. Clark

UNITED STATES PATENT OFFICE.

JOHN P. KENNEDY, OF NEW YORK, N. Y.

MACHINE FOR SWAGING THE ENDS OF TUBES.

SPECIFICATION forming part of Letters Patent No. 457,954, dated August 18, 1891.

Application filed March 14, 1890. Serial No. 343,907. (No model.)

*To all whom it may concern:*

Be it known that I, JOHN P. KENNEDY, a citizen of the United States, residing at New York city, in the county of New York and State of New York, have invented certain new and useful Improvements in Machines for Swaging the Ends of Metal Tubes; and I do hereby declare the following to be a full, clear, and exact description of the invention, such as will enable others skilled in the art to which it appertains to make and use the same.

This invention relates to a hand-operated machine for swaging the ends of wrought-metal tubes into conical or tapered form preparatory to closing such ends by welding the metal directly upon itself and forming hemispherical ends of seamless thickened metal, and is an improvement upon the machine covered by my patent, No. 368,837, dated August 3, 1887, method of and machine for swaging and welding the ends of wrought-metal tubes.

The object of my present invention is to provide a feed-gearing embracing a feed-screw, a holder at one end of such screw for supporting one end of the tube, and a releasing device, which are simpler in construction, more effective, accurate, and rapid in operation, and less liable to get out of order and require repair than the mechanism described for a similar purpose in my former patent.

Another object is to provide adjustable means for swaging tubes of different lengths in the same machine.

The swaging-machine constructed in accordance with my above-mentioned patent, while capable of doing good work, was expensive to construct and was comparatively slow and cumbersome in operation, and, moreover, was wearing upon the attendant who operated it on account of the jarring or vibrating motion imparted to the feeding mechanism controlled by such attendant. My improved machine overcomes these difficulties and is capable of turning out a largely-increased amount of work in a given time.

In carrying out my invention I provide comparatively flexible or yielding connections between the swaging-dies and feeding mechanism, and also arrange the tube to be swaged so that it shall be supported at its rear end by a holder in a comparatively yielding manner, whereby it will adapt itself to the action of the dies, but will be securely held and rotated by the holder and feeding mechanism. I also provide a work or tube holder, consisting, preferably, of an expansible clutch-plug working over a tapered or wedge like end of the shank of the feed-screw and having a longitudinal sliding motion thereon, causing it to securely clutch the tube when forced back and expanded upon the tapered shank, or to release the tube when forced forward and permitted to collapse or contract thereon. Other forms of work or tube holder may obviously be used—such as a screw-threaded plug or the well-known conical chuck—without departing from the spirit of my invention.

I will particularly describe my improved machine by reference to the accompanying drawings, and then define the matter constituting my invention in the claims.

In the drawings, Figure 1 represents a top plan view, partly in section, of the tube supporting and feeding mechanism of my swaging-machine. Fig. 2 represents a side elevation thereof, also partly in section. Figs. 3 and 4 represent sectional detail views of one form of head or plug for holding the tube. Figs. 5 and 6 represent detail end views of my expansible clutch-plug for holding the tube while being swaged and for automatically releasing it after the swaging operation.

In this machine I use the same general form of framing A, bed-plate A', base B, and semi-conical dies G as those described in my former patent, No. 368,837. I also use substantially the same form of mechanism for operating the upper semi-conical die as that described in said patent; but I do not show such die-operating mechanism, as it forms no part of this invention.

The side bars C for supporting the feed mechanism and tube to be swaged are bolted at their inner ends to the side frames A A, as shown in Figs. 1 and 2, and they are supported in a horizontal position by the braces D, having flanged ends *d d'*, by which they are bolted respectively to the side bars C and to the base B. The side supporting-bars are composed of the fixed portion C and the detachable extension-pieces C', properly connected together, as shown. The bars C are provided at their outer ends with shoulders *c* and with screw-threaded ends *b*. The detachable extension-pieces C' are provided at their inner ends with screw-threaded sockets *e* for connecting with the screw-threaded ends *b*, and at their outer ends they each have a short squared or angular section *c'* for the application of a wrench, and beyond such angular section there is a screw-threaded projection for the application of nuts *a'*. The detachable and interchangeable extension-pieces C' are made in pairs of different lengths, so that by using a short or long pair of pieces C' the feeding mechanism can be set nearer to or farther from the swaging-dies to adapt the machine for swaging tubes of different lengths. The screw-threaded ends *b* are of the same size as the outer screw-threaded ends *b'* of the pieces C', so that the cross-bar F could be connected directly to such screw-threaded ends *b* by means of nuts *a'*.

The bars C may be extended at their rear ends, as indicated by dotted lines, and the extensions provided with bolt-holes, so that such bars may be adjusted forward, if desired, to adapt the machine for swaging longer tubes. The bolt-holes may also be in the nature of longitudinal slots to permit of adjustment of the bars either forward or backward. A number of bolt-holes may also be provided in the bars near their front ends for the bolts which pass through flanges *d* of the braces D, or such braces may be otherwise clamped to the side bars. The cross-bar F is secured to the side bars C or detachable extension-pieces C' by means of the screw-threaded ends *b* and nuts *a'*, being securely held between the shoulders *e* and nuts *a'*, or the squared portions *c* and nuts *a'*, as the case may be. The cross-bar F is provided at its central portion with a screw-threaded bushing *f*, which is secured by a large nut *f'*, and in such screw-threaded bushing is inserted the feed-screw H. This feed-screw H has secured to its inner end the work or tube holder, preferably in the form of an expansible clutch-plug K. The expansible plug K is made in two or three longitudinal sections—three of such sections 1 2 3 being shown in the drawings, Fig. 5,—and is readily operated both to hold the tube while being swaged and to release it after the swaging operation. The shank H' at the end of the feed-screw is made of any suitable cross-section—such as triangular, as shown in Fig. 6, or rectangular—and has two or more of its sides tapered so as to act as a wedge. An elongated bolt *h'* projects from the tapered end of the shank and has its outer end screw-threaded for receiving the nut and jam-nut *k*. The elongated bolt or reduced portion at end of tapered shank, instead of being screw-threaded, may be left plain, and instead of having a nut applied to it may be provided with a solid head to prevent the expansible plug from slipping off endwise. The sections of the plug may be readily placed in position around the tapered shank and held together by elastic retaining-rings composed of coiled bell-springs. The rear ends of the sections composing the plug K are provided at their outer or curved surfaces with outwardly-extending flanges *k'*, which serve, when the sections are in position, as a stop for the rear end of the tube when placed upon the plug. The sections are also provided with depressions or grooves *m*, preferably in the flanges *k'*, for the application of a ring, which may be in the nature of a spring, for holding the sections together upon the shank. The body of the plug, composed of sections, may be nearly cylindrical at its outer surface, but the end is rounded or tapered and is provided with a circular groove *m'* for receiving a retaining-ring, which may also be in the nature of a spring. The sections are made with internal recesses of suitable form to fit upon the tapered and angular shank H', also upon its smooth cylindrical portion to the screw-thread and around its elongated bolt *h'*, so that when such sections are applied in position they will form a plug which is free to reciprocate back and forth upon the wedge-shaped shank. Interior shoulders *h''* are formed at the junction of the angular and the curved or circular recesses in the sections of the plug for abutting against shoulders *j* at the base of the tapered shank. After the sections have been applied and properly secured in place by retaining-rings inserted in grooves *m* and *m'*, a nut and jam-nut *k* are screwed onto the end of bolt *h'* to prevent the plug from slipping off from the shank. When, however, the elongated bolt or reduced portion is provided with a solid head, no nut will be required, and the sections of the plug will be laid in position around the tapered shank. It is seen that the plug will have a longitudinal sliding movement on the bolt *h'* and tapered or wedge-shaped shank H'. It will also be seen that as the plug is driven backward its sections will be expanded by contact with the tapered or wedge-like surfaces of the shank H', so as to securely clutch the tube; also, that such sections will be permitted to collapse or contract when forced forward so as to release the tube. The backward movement of the plug is limited by shoulders *h''*, abutting against the shoulder *j* at the base of the angular shank H'.

I prefer the expansible clutch-plug above described, but under some circumstances might use the screw-threaded plug shown in Figs. 3 and 4. In case this screw-threaded plug is used, the screw-thread is preferably cut away at different parts in its circumference, so that the sharp ends of the threads will better cut into the metal tube and hold it from slipping or turning while its opposite end is being swaged.

Instead of a plug for holding one end of the tube, I may use the well-known conical chuck for such purpose and attach such a chuck to the end of the feed-screw. I have used such a chuck in practice with satisfactory results. The end of the tube in this latter case is inserted in the conical chuck.

The feed-screw H corresponds to the feed-cylinder described in my former patent, but is preferably made solid and of much reduced diameter, as shown, whereby it is more yielding, and, besides, can be worked much more rapidly through the screw-threaded bushing. The handle $h$ is applied to the outer end of feed-screw H and is held thereon by a nut, as shown.

A tube-rest E is bolted to the side-bars C, as shown in Figs. 1 and 2, and serves to strengthen the parts and at the same time support the tube while its end is being swaged.

The operation of swaging tubes with my machine is very simple, and is conducted as follows: The tube to be swaged is first heated at one end to the proper working temperature and then its opposite end is slipped over the expansible clutch-plug K, where it is securely held by frictional contact or by expansion of the sections 1 2 3. The upper swaging-die being in operation, the feed-screw H is now turned to the right by means of the handle $h$, thus rotating the tube and feeding it forward into the semi-conical dies, where its inner end is quickly swaged into a tapered or conical form. Owing to the resistance offered by the dies, the advancing tube will be forced backward upon the clutch-plug. Supposing the expansible plug to be in use, the sections thereof will be forced backward upon the tapered shank H' and caused to jamb against the interior of the tube and securely hold it and cause it to rotate with the feed-screw. The operation of swaging the tube is quickly and accurately performed with this improved machine, and as soon as swaged the feed-screw H is turned to the left, thus withdrawing the tube from the dies, and the feed-screw is drawn back until the rear flanged end of the plug strikes the nut $f$ and pushes the expansible plug forward, whereby the sections are permitted to collapse or draw together upon the shank H' and bolt $h'$, thereby releasing the tube, which is then moved by an attendant. The rest E supports the tube during the swaging operation and also after it is released from the plug till removed by the attendant. After the ends of the tubes have been swaged into a tapered or conical form with this machine, they are reheated and placed upon a mandrel having a rounded or hemispherical end in a separate machine, and then, by means of a cupping-die, are quickly formed with seamless hemispherical ends of thickened metal welded directly upon itself.

By the above-described method the tubes are provided with a perfect closure, and I have found that the metal where welded was homogeneous in structure and was very durable in use. Such tubes are used in the well-known "porcupine" boiler, and have proved very satisfactory in use.

Having described my invention, what I claim, and desire to secure by Letters Patent, is—

1. In a machine for swaging the ends of metal tubes, the combination, with swaging-dies, of feed mechanism composed of a suitably-supported and fixed cross-bar having a screw-threaded opening, a feed-screw in such opening, a work or tube holder connected to one end of the feed-screw and adapted to receive and hold one end of the tube to be swaged, and means for turning the screw, substantially as described.

2. In a machine for swaging the ends of metal tubes, the combination, with swaging-dies, of feed mechanism composed of a fixed cross-bar having a screw-threaded bushing suitably supported in front of the swaging-dies, a feed-screw working through such bushing and carrying at its inner end a clutch-plug adapted for receiving and holding one end of the tube to be swaged, and a handle secured to the feed-screw for operating it, as described.

3. In a machine for swaging the ends of metal tubes, the combination, with swaging-dies, of a feed-screw having a tapered shank, an expansible clutch-plug free to slide back and forth on such shank and composed of two or more sections adapted to hold a tube when forced back and expanded on the tapered shank and to release such tube when forced forward and collapsed, as described.

4. In a machine for swaging the ends of metal tubes, the feed-screw having a tapered shank, a shoulder $j$, and an extension of reduced diameter at the end of the shank provided with a nut or head, in combination with a slidable expansible clutch-plug composed of two or more sections, each having at its rear end a flange $k'$, operating substantially as and for the purpose described.

5. In a machine for swaging the ends of metal tubes, the feed-screw having a tapered shank, in combination with an expansible clutch-plug free to slide back and forth on such shank and composed of two or more sections, one or more yielding retaining-rings for holding the sections on the shank, and means for limiting the back-and-forth motion of the plug on the shank, substantially as described.

6. In a machine for swaging the ends of metal tubes, the feed-screw having a tapered shank, a shoulder at the base of the shank, and a nut or head at its reduced outer end, in combination with an expansible clutch-plug composed of two or more sections, each of which is recessed internally to fit the angular form of the tapered shank, and also recessed near their rear ends, so as to receive the cylindrical portion of the screw when the plug is slid backward, and also having interior shoulders for abutting against the shoulder on the screw-shank, substantially as described.

7. In combination with the swaging-dies and the feeding mechanism of a machine for swaging the ends of tubes, the extended side bars, means for adjusting them out or in for different-length tubes to be swaged, and connections to the cross-bar which supports the feed-screw, substantially as described.

8. In combination with swaging-dies and feed mechanism of a machine for swaging the ends of tubes, the side bars, and the detachable extension-pieces connecting them with the cross-bar which supports the feed-screw, substantially as described.

9. In combination with swaging-dies and the feeding mechanism of a machine for swaging the ends of tubes, the side bars C, having shoulders c, projecting screw-threaded ends b, and the detachable extension-pieces C', having screw-threaded sockets e and screw-threaded ends for connection with the cross-bar F, carrying the feed-screw H, substantially as described.

10. In combination with swaging-dies and the feeding mechanism of a machine for swaging the ends of tubes, the side bars C, having shoulders c, and projecting screw-threaded ends b for connection with the cross-bar F, carrying the feed-screw H, the braces D, and the tube-rest E, as and for the purpose described.

In testimony whereof I affix my signature in presence of two witnesses.

JOHN P. KENNEDY.

Witnesses:
  B. WILLIAM HOYT,
  J. FREDK. LARBEY.